(12) United States Patent
Xiang et al.

(10) Patent No.: US 11,841,762 B2
(45) Date of Patent: Dec. 12, 2023

(54) DATA PROCESSING

(71) Applicant: HANGZHOU HIKVISION DIGITAL TECHNOLOGY CO., LTD., Hangzhou (CN)

(72) Inventors: Yang Xiang, Hangzhou (CN); Yuanzhi Qi, Hangzhou (CN); Jie Yan, Hangzhou (CN); Bin Zhang, Hangzhou (CN); Qi Wu, Hangzhou (CN); Ming Chen, Hangzhou (CN); Qingxiao Ni, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 451 days.

(21) Appl. No.: 16/976,190

(22) PCT Filed: Mar. 19, 2019

(86) PCT No.: PCT/CN2019/078582
§ 371 (c)(1),
(2) Date: Aug. 27, 2020

(87) PCT Pub. No.: WO2019/184758
PCT Pub. Date: Oct. 3, 2019

(65) Prior Publication Data
US 2021/0004286 A1    Jan. 7, 2021

(30) Foreign Application Priority Data

Mar. 27, 2018   (CN) .......... 201810259318.X

(51) Int. Cl.
*G06F 11/07* (2006.01)
*G06F 3/06* (2006.01)
*H04N 9/87* (2006.01)

(52) U.S. Cl.
CPC .......... *G06F 11/0793* (2013.01); *G06F 3/067* (2013.01); *G06F 3/0619* (2013.01);
(Continued)

(58) Field of Classification Search
CPC ............ G06F 11/0793; G06F 11/0709; G06F 11/0751
See application file for complete search history.

(56) References Cited

U.S. PATENT DOCUMENTS 9,405,626 B1    8/2016  Foley et al.
2003/0200478 A1*  10/2003  Anderson ................. H04L 1/22
                                                714/E11.034
(Continued)

FOREIGN PATENT DOCUMENTS

CN    103699337    4/2014
CN    103729151    4/2014
(Continued)

OTHER PUBLICATIONS

PCT International Written Opinion in International Appln No. PCT/CN2019/078,582, dated Jun. 19, 2019, 8 pages (With English Translation).

(Continued)

*Primary Examiner* — Jigar P Patel
(74) *Attorney, Agent, or Firm* — Fish & Richardson P.C.

(57) ABSTRACT

Provided are a data processing method and an apparatus thereof. The method includes: when data writing is to be performed for a target Trunk Group (TKG), determining whether the target TKG is available (S100); when the target TKG is available, performing data writing for the target TKG (S110); and, when the target TKG is unavailable, repairing the target TKG, and performing data writing for the repaired target TKG (S120).

8 Claims, 6 Drawing Sheets

(52) U.S. Cl.
CPC ........ *G06F 3/0659* (2013.01); *G06F 11/0709* (2013.01); *G06F 11/0751* (2013.01); *H04N 9/87* (2013.01)

(56) References Cited

U.S. PATENT DOCUMENTS

| | | | |
|---|---|---|---|
| 2007/0061672 A1* | 3/2007 | Eggleston | G06F 11/1008 714/E11.035 |
| 2009/0276771 A1* | 11/2009 | Nickolov | H04L 67/1008 718/1 |
| 2015/0347224 A1* | 12/2015 | Abe | G06F 11/1084 714/6.24 |
| 2016/0011939 A1 | 1/2016 | Luby et al. | |
| 2016/0085621 A1* | 3/2016 | Motwani | G06F 11/1076 714/764 |
| 2016/0179609 A1* | 6/2016 | Zhou | G06F 3/0617 714/6.13 |
| 2016/0357634 A1 | 12/2016 | Daohui et al. | |
| 2017/0255522 A1 | 9/2017 | Daohui et al. | |
| 2018/0074898 A1 | 3/2018 | Daohui et al. | |
| 2018/0089077 A1* | 3/2018 | Gao | G06F 3/064 |
| 2018/0357141 A1* | 12/2018 | Agombar | G06F 11/2089 |

FOREIGN PATENT DOCUMENTS

| | | |
|---|---|---|
| CN | 103970487 | 8/2014 |
| CN | 103984607 | 8/2014 |
| CN | 104035840 | 9/2014 |
| CN | 104516679 | 4/2015 |
| CN | 105095013 | 11/2015 |
| CN | 106227617 | 12/2016 |
| CN | 106407033 | 2/2017 |
| CN | 107748702 | 3/2018 |
| EP | 3128429 | 2/2017 |
| WO | 2010033644 | 3/2010 |
| WO | 2019184758 | 10/2019 |

OTHER PUBLICATIONS

Chinese Office Action and Search Report issued in Chinese Application No. 201810259318.X dated Apr. 16, 2020, 25 pages (With English Translation).
PCT International Search Report and Written Opinion in International Application No. PCT/CN2019/078,582, dated Jun. 19, 2019, 9 pages (With Partial English Translation).
CN Office Action issued in Chinese Appln. No. 201810259318.X, dated Oct. 23, 2020, 11 pages (With Partial English Translation).
Partial Supplementary European Search Report issued in European Appln. No. 19778407.7, dated Apr. 12, 2021, 16 pages.

\* cited by examiner

DATA PROCESSING

CROSS REFERENCE TO RELATED APPLICATIONS

This patent application is a national stage application of International Application No. PCT/CN2019/078582, filed on Mar. 19, 2019, which claims priority to Chinese Patent Application No. 201810259318X, entitled "a data processing method and apparatus thereof", filed on Mar. 27, 2018, the entire contents of which are incorporated herein by reference.

TECHNICAL FIELD

The present disclosure relates to computer storage technologies, and in particular to a data processing method and an apparatus thereof.

BACKGROUND

With development of a Redundant Array of Independent Disks Version 2.0 (RAID2.0) technology and an Erasure Coding (EC) algorithm, most products adopt a combination of the two technologies to enable the RAID to break through the limitation that RAID6 only has two redundant disks. With the RAID2.0 technology, a disk is divided into several Trunks to realize the RAID and achieve any combination of arrays N+M (N>=M and N>1) based on the EC algorithm, thereby providing higher redundancy and security to users, where N refers to the number of raw data chunks, and M refers to the number of check data chunks.

However, it is found through practices that during the implementation of the existing RAID2.0, when the array is unavailable due to an abnormal disk or storage node, services will be interrupted and service stability is poor.

SUMMARY

In view of this, the present disclosure provides a data processing method and an apparatus thereof.

Specifically, the present disclosure is achieved through the following technical solution.

According to a first aspect of examples of the present disclosure, there is provided a data processing method, including: when data writing is to be performed for a target Trunk Group (TKG), determining whether the target TKG is available, where in an initial state, one TKG includes N Trunks for storing raw data and M Trunks for storing check data, any M Trunks in the N+M Trunks belong to at least K storage nodes, N≥M, N>1, and 0≤K≤M; if the target TKG is available, performing data writing for the target TKG; otherwise, repairing the target TKG, and performing data writing for the repaired target TKG.

In an example, repairing the target TKG includes: determining whether a first repair scheme by which the target TKG is repaired to have N+M available Trunks with any M Trunks belonging to the at least K storage nodes exists according to available Trunk resources; and if the first repair scheme exists, repairing the target TKG according to the first repair scheme.

In an example, repairing the target TKG further includes: if the first repair scheme does not exist and K>0, letting K=K−1 and repeating the above determining block until it is determined that the first repair scheme exists or K=0; and if K=0, determining whether a second repair scheme by which the target TKG is repaired to have N+M available Trunks exists according to the available Trunk resources.

In this case, if the second repair scheme exists, the target TKG is repaired according to the second repair scheme; otherwise, when M>0, let M=M−1, and whether the second repair scheme exists is repeatedly determined until it is determined that the second repair scheme exists or M=0. If the second repair scheme exists, the target TKG is repaired according to the second repair scheme; if M=0, it is determined that the target TKG unsuccessfully repaired.

In an example, the data is video data, and the method further includes: when video playback is to be performed according to the data in the target TKG and the target TKG is unavailable, reading the video data from the available Trunks included in the target TKG; and if the read video data includes I frames of data, performing video playback according to the read video data.

In an example, the method further includes: when a target disk is recovered from abnormal, determining whether data writing is performed for any TKG associated with the target disk when the target disk is abnormal; if the determination result is yes, reconstructing the TKG; otherwise, denying reconstructing the TKG.

In an example, if the target TKG is available, before data writing is performed for the target TKG, the method further includes: determining whether the target TKG is degraded; if the determination result is yes, repairing the target TKG, and performing data writing for the repaired target TKG; otherwise, determining to perform the block of performing data writing for the target TKG.

According to a second aspect of examples of the present disclosure, there is provided a data processing apparatus, including the following units.

A determining unit is configured to determine whether a target Trunk Group (TKG) is available when a data writing unit is to perform data writing for the target TKG, where, in an initial state, one TKG includes N Trunks for storing original data and M Trunks for storing check data, any M Trunks in the N+M Trunks belong to at least K storage nodes, where N≥M, N>1, and 0≤K≤M.

A data writing unit is configured to perform data writing for the target TKG if the target TKG is available.

A repairing unit is configured to repair the target TKG if the data writing unit is to perform data writing for the target TKG and the target TKG is unavailable; the data writing unit is further configured to perform data writing for the repaired target TKG.

In an example, the determining unit is further configured to determine whether a first repair scheme by which the target TKG is repaired to have N+M available Trunks with any M Trunks belonging to at least K storage nodes exists according to available Trunk resources; if the first repair scheme exists, the repairing unit is configured to repair the target TKG according to the repair scheme.

In an example, if the first repair scheme does not exist and K>0, the determining unit is further configured to let K=K−1 and repeatedly determine whether the first repair scheme exists until it is determined that the first repair scheme exists or K=0; if K=0, the determining unit is further configured to determine whether a second repair scheme by which the target TKG is repaired to have N+M available Trunks exists according to the available Trunk resources.

In this case, if the second repair scheme exists, the repairing unit is further configured to repair the target TKG according to the second repair scheme. If the second repair scheme does not exist and M>0, the determining unit is further configured to let M=M−1 and repeatedly determine whether the second repair scheme exists until it is determined that the second repair scheme exists or M=0. The repairing unit is further configured to: repair the target TKG according to the repair scheme if the second repair scheme exists; and if M=0, determine that the target TKG is unsuccessfully repaired.

In an example, the data is video data, and the apparatus further includes: a data reading unit, configured to read the video data from the available Trunks included in the target TKG when video playback is to be performed according to the data in the target TKG and the target TKG is unavailable; and a video playing-back unit, configured to perform video playback according to the read video data if the read video data includes I frames of data.

In an example, when a target disk is recovered from abnormal, the determining unit is further configured to determine whether data writing is performed for any TKG associated with the target disk when the target disk is abnormal.

The apparatus further includes: a reconstructing unit, configured to reconstruct the TKG if data writing is performed for the TKG when the target disk is abnormal; and deny reconstructing the TKG if not.

In an example, if the target TKG is available, the determining unit is further configured to determine whether the target TKG is degraded; if the target TKG is degraded, the repairing unit is further configured to repair the target TKG; the data writing unit is further configured to perform data writing for the repaired target TKG; if the target TKG is not degraded, the data writing unit is configured to perform data writing for the target TKG.

According to a third aspect of examples of the present disclosure, there is provided a data processing apparatus for performing the method according to the first aspect. The apparatus includes a processor and a machine readable storage medium, the machine readable storage medium stores machine executable instructions executable by the processor, and the processor is caused by the machine executable instructions to:

when data writing is to be performed for a target Trunk Group (TKG), determine whether the target TKG is available, where in an initial state, one TKG includes N Trunks for storing raw data and M Trunks for storing check data, any M Trunks in the N+M Trunks belong to at least K storage nodes, N≥M, N>1, and 0≤K≤M;
    if the target TKG is available, perform data writing for the target TKG; and
    if the target TKG is unavailable, repair the target TKG and perform data writing for the repaired target TKG.

According to a fourth aspect of examples of the present disclosure, there is provided a machine readable storage medium storing machine executable instructions. When being invoked and executed by the processor, the machine executable instructions cause the processor to:

when data writing is to be performed for a target Trunk Group (TKG), determine whether the target TKG is available, where in an initial state, one TKG includes N Trunks for storing raw data and M Trunks for storing check data, any M Trunks in the N+M Trunks belong to at least K storage nodes, N≥M, N>1, and 0≤K≤M;
    if the target TKG is available, perform data writing for the target TKG; and
    if the target TKG is unavailable, repair the target TKG and perform data writing for the repaired target TKG.

According to the data processing method of the examples of the present disclosure, when data writing is to be performed for the target TKG, it is determined that whether the target TKG is available; if the target TKG is available, data writing is performed for the target TKG; otherwise, the target TKG is repaired, and data writing is performed for the repaired target TKG. Therefore, service interruption resulted from the TKG unavailability caused by the abnormal disk or storage node is avoided, and service stability is improved.

DETAILED DESCRIPTION OF THE EMBODIMENTS

Figure 1:
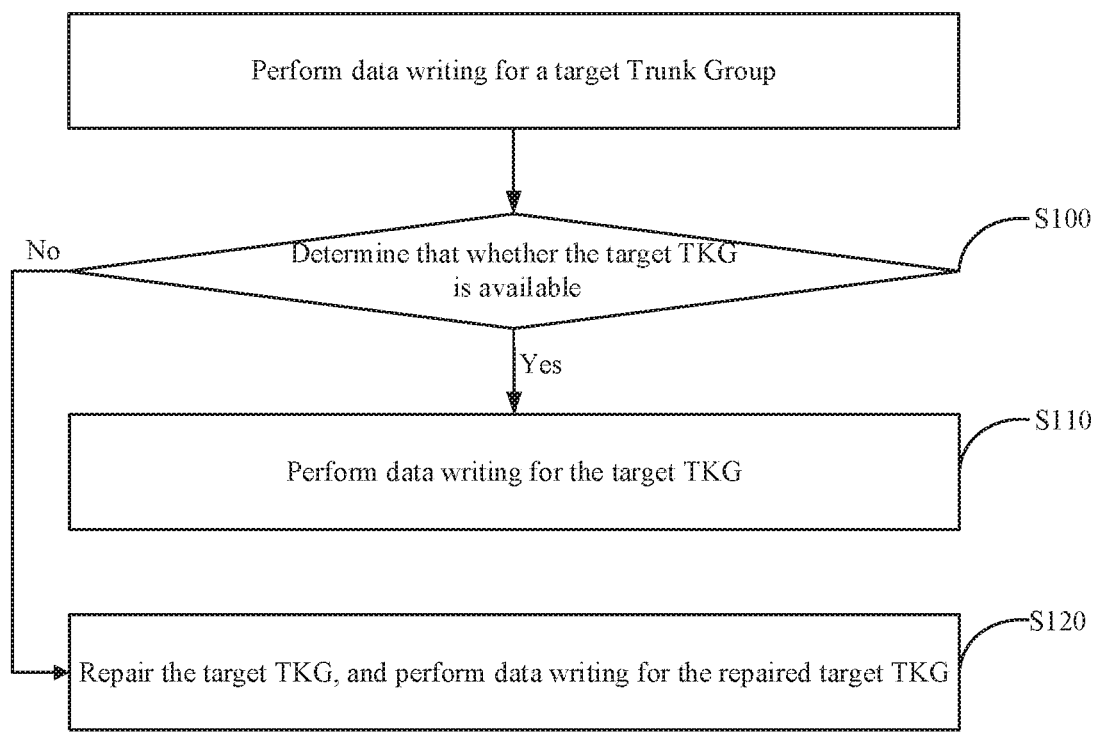
FIG. 1 is a flowchart illustrating a data processing method according to some examples of the present disclosure.

Examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing particular examples only, and is not intended to be limiting of the present disclosure. The singular forms such as "a", "said", and "the" used in the present disclosure and the appended claims are also intended to include multiple, unless the context clearly indicates otherwise.

To help those skilled in the art to understand the technical solution according to the examples of the present disclosure better and to understand the above objects, features and advantages of the examples of present disclosure more easily, the technical solution according to the examples of the present disclosure will be further described in detail below in combination with drawings.

FIG. 1 is a flowchart illustrating a data processing method according to some examples of the present disclosure. The data processing method may be applied to any storage node in a distributed storage system. As shown in FIG. 1, the method includes the following blocks S100-S120.

At block S100, when data writing is performed for a target Trunk Group (TKG), it is determined that whether the target TKG is available. If the determination result is yes, block S110 is performed; otherwise, block S120 is performed.

In the examples of the present disclosure, a disk resource pool formed by a plurality of disks is selected from a plurality of storage nodes (for example, n storage nodes) in the distributed storage system, and Trunk division is performed for each disk in the disk resource pool according to a preset size. These trunks form a Trunk Group (TKG) and a RAID2.0 array is further established.

One RAID2.0 array includes one or more TKGs (the array includes more TKGs in some examples), and the one or more TKGs are referred to as a TKG group. In an initial state, one TKG includes N+M Trunks (including N Trunks for storing raw data and M Trunks for storing check data), and any M Trunks in the N+M Trunks belong to at least K storage nodes. Therefore, one TKG has a redundancy of M Trunks and a redundancy of K storage nodes, that is, a maximum of M Trunks are allowed to be unavailable (for example, the Trunks are unavailable due to the unavailable disk or storage node where the Trunks are located), and a maximum of K storage nodes are allowed to be unavailable (such as a power-down and a failure).

As above, $N \geq M$, $N > 1$, $0 \leq K \leq M$.

In some examples, N+M Trunks included in one TKG belong to N+M different disks. Further, one TKG has a redundancy of M disks, that is, a maximum of M disks are allowed to be unavailable (such as failed and pulled out).

In the examples of the present disclosure, the target TKG does not specifically refer to a particular fixed TKG, but refers to any TKG in any TKG group, which will not be described repeatedly in subsequent examples of the present disclosure.

In the examples of the present disclosure, a correspondence of a data source and a TKG group is pre-configured. For any TKG group, when data that is received by the storage node from a corresponding data source reaches a storage size of one TKG, the storage node divides the received data into N raw data chunks equally, calculates M check data chunks based on an EC algorithm according to the N raw data chunks, and writes the N+M data chunks into N+M Trunks of a particular TKG in the TKG group.

The data size written into each Trunk each time is one Chunk, and one Trunk is divided into a plurality of Chunks.

In the examples of the present disclosure, when performing data writing for the target TKG, the storage node determines whether the target TKG is available.

When the number of unavailable Trunks in the target TKG exceeds M, the target TKG is determined as unavailable (disabled). If the target TKG is determined as available, block S110 is performed.

At block S10, data writing is performed for the target TKG.

In the examples of the present disclosure, if determining that the target TKG is available, the storage node directly performs data writing for the target TKG.

If the target TKG is in a normal state, that is, the N+M Trunks included in the target TKG are all available, the storage node writes N raw data chunks and M check data chunks into N+M Trunks of the target TKG respectively.

If the target TKG is in a degraded state, that is, the number of available Trunks included in the target TKG is greater than or equal to N and less than N+M, the storage node writes data chunks that are in the N raw data chunks and the M check data chunks and equal to the number of the available Trunks into different available Trunks respectively.

In some examples, the storage node writes the raw data chunks into the available Trunks of the target TKG in priority.

At block S120, the target TKG is repaired, and data writing is performed for the repaired target TKG.

In the examples of the present disclosure, when the TKG for which data writing is to be performed is unavailable due to the unavailable disk or node, the TKG is firstly repaired without interrupting services and then, data writing is performed for the repaired TKG after the repair is successful. In this way, the influence of the unavailable disk or node on the services is avoided.

Correspondingly, in the examples of the present disclosure, when the storage node determines that the target TKG is unavailable, the storage node repairs the target TKG.

Figure 2:
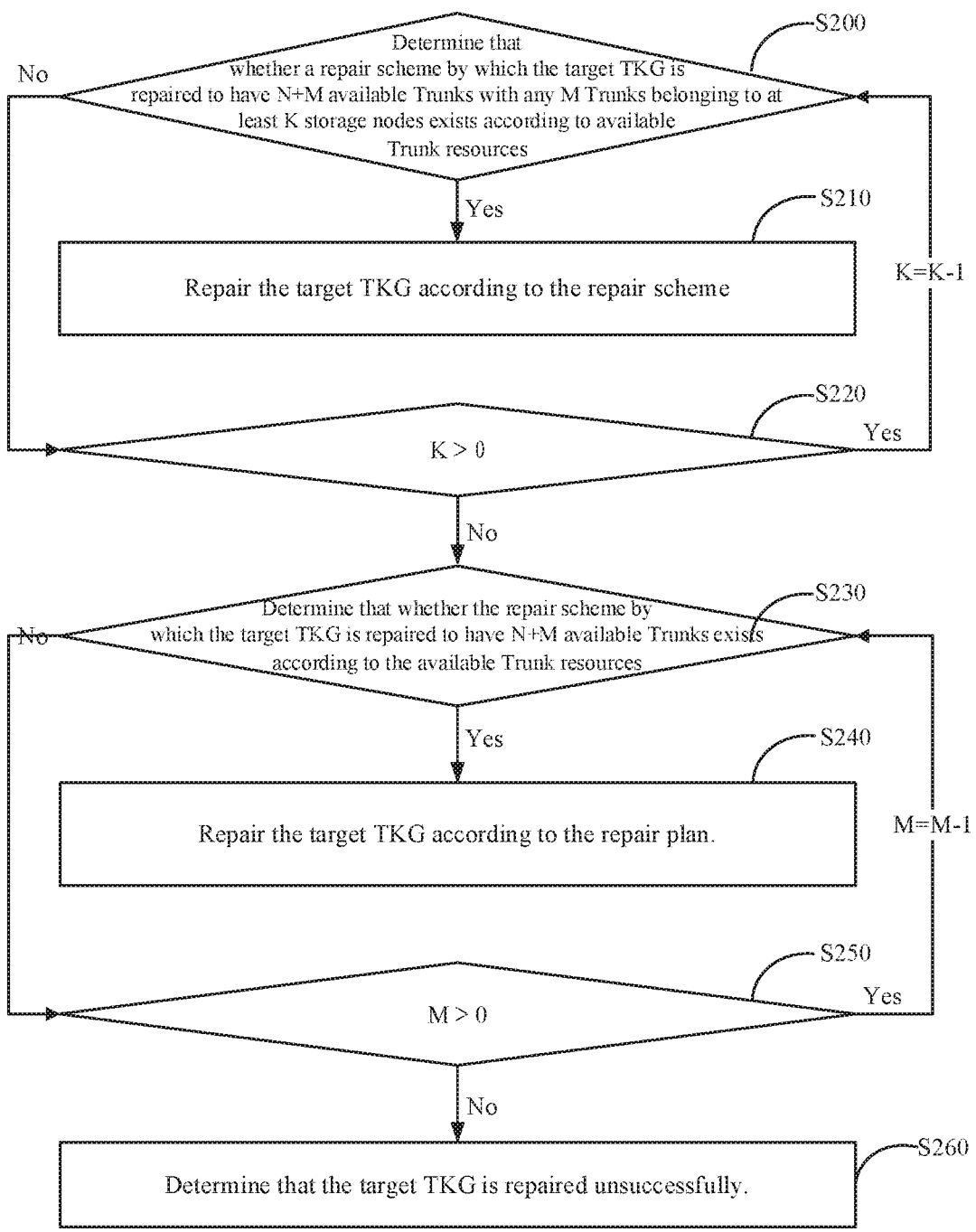
FIG. 2 is a flowchart illustrating a method of repairing a target TKG according to some examples of the present disclosure.

As shown in FIG. 2, in some examples of the present disclosure, repairing the target TKG includes the following blocks S200-S260.

At block S200, it is determined that whether a repair scheme by which the target TKG is repaired to have N+M available Trunks with any M Trunks belonging to at least K storage nodes exists according to available Trunk resources. If the determination result is yes, block S210 is performed; otherwise, block S220 is performed.

In the examples, when the TKG for which data writing is to be performed is unavailable, that is, when the number of unavailable Trunks in the TKG exceeds M, the storage node reconstructs the target TKG according to the available Trunk resources and repairs the TKG in a manner of updating information in a memory and metadata.

The available Trunk resources during repair of the TKG include idle available Trunks in the disk resource pool.

In the examples, the storage node reconstructs the TKG according to a principle of "optimal redundancy ratio". That is, it is firstly determined that whether the currently available Trunk resources satisfy the redundancy of K storage nodes (that is, the repaired TKG is enabled to satisfy the redundancy of M Trunks and the redundancy of K storage nodes at the same time, which is referred to as JUDGE_K herein), and then, it is determined that whether the redundancy of M Trunks is satisfied as at block S230 (that is, the repaired TKG is enabled to satisfy the redundancy of M Trunks).

Correspondingly, at block S200, when the storage node is to repair the target TKG, the storage node determines whether the repair scheme by which the target TKG is repaired to have N+M available Trunks with any M Trunks belonging to at least K storage nodes exists according to the available Trunk resources.

At block S210, the target TKG is repaired according to the repair scheme.

In the examples, when the storage node determines that the repair scheme by which the target TKG is repaired to have N+M available Trunks with any M Trunks belonging to at least K storage nodes exists, the storage node repairs the target TKG according to the repair scheme.

At block S220, if K>0, let K=K−1 and block S200 is performed; if K=0, block S230 is performed.

In an example, if the storage node determines that the repair scheme by which the target TKG is repaired to have N+M available Trunks with any M Trunks belonging to at least K storage nodes does not exist and K>0, the storage node lets K=K−1 and performs block S200; otherwise, the storage node performs block S230.

At block S230, it is determined that whether the repair scheme by which the target TKG is repaired to have N+M available Trunks exists according to the available Trunk resources. If the repair scheme exists, block S240 is performed; otherwise, block S250 is performed.

In an example, when the repair scheme satisfying the redundancy of the storage node does not exist, the storage node only considers the redundancy of the Trunk.

Correspondingly, the storage node determines whether the repair scheme by which the target TKG is repaired to have N+M available Trunks exists according to the available Trunk resources, that is, whether a repair scheme by which the target TKG is repaired to have the redundancy of M Trunks exists.

At block S240, the target TKG is repaired according to the repair scheme.

In an example, when determining that the repair scheme by which the target TKG is repaired to have N+M available Trunks exists, the storage node repairs the target TKG according to the repair scheme.

At block S250, if M>0, let M=M−1, and block S230 is performed; if M=0, block S260 is performed.

In an example, if the storage node determines that the repair scheme by which the target TKG is repaired to have N+M available Trunks does not exist and M>0, the storage node lets M=M−1 and performs block S230; otherwise, the storage node performs block S260.

At block S260, it is determined that the target TKG is repaired unsuccessfully.

In an example, when M=0, if the repair scheme by which the target TKG is repaired to have N+M available Trunks still does not exist, that is, the repair scheme by which the target TKG is repaired to have N available Trunks still does not exists, the target TKG cannot be repaired to be in an available state, and the storage node determines that the target TKG is repaired unsuccessfully.

In the examples of the present disclosure, after successfully repairing the target TKG, the storage node performs data writing for the repaired target TKG.

As seen in the method flow shown in FIG. 1, when part of TKGs are unavailable due to the unavailable disk or node, without directly interrupting services, data writing is performed for the available TKGs in the TKG group according to the available state of each TKG in the TKG group, and, data writing is performed for the unavailable TKGs in the TKG group after the unavailable TKGs in the TKG group are repaired, thereby improving the service stability.

Figure 3:
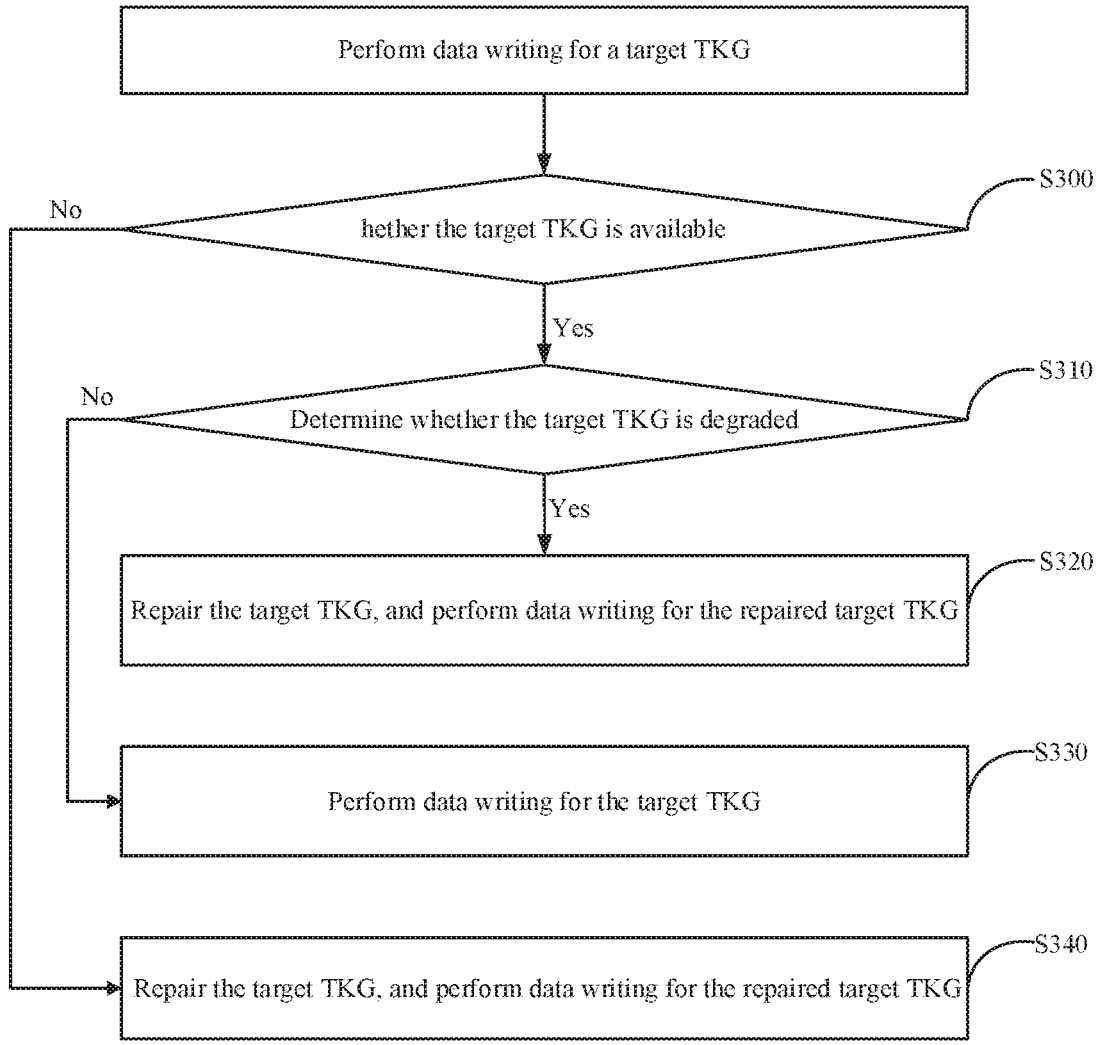
FIG. 3 is a flowchart illustrating another data processing method according to some examples of the present disclosure.

FIG. 3 is a flowchart illustrating another data processing method according to some examples of the present disclosure. The data processing method may be applied to any storage node in a distributed storage system. As shown in FIG. 3, the method includes the following blocks S300-S340.

At block S300, when data writing is to be performed for a target TKG, it is determined that whether the target TKG is available. If the determination result is yes, block S310 is performed; otherwise, block S340 is performed.

In the examples of the present disclosure, the specific implementation of block S300 is made by referring to relevant descriptions in block S100, which will not be described herein.

At block S310, it is determined that whether the target TKG is degraded. If the determination result is yes, block S320 is performed; otherwise, block S330 is performed.

In the examples of the present disclosure, the TKG degraded due to the unavailable disk or node has a requirement of reconstruction when the disk or the node is repaired to be in an available state, and resource consumption resulting from the reconstruction affects external services of the system when the system is busy. Therefore, before performing data writing for the TKG, the storage node firstly determines whether the TKG is degraded. When determining that the TKG is degraded, the storage node firstly repairs the TKG, and then performs data writing.

Correspondingly, in the examples of the present disclosure, when the storage node determines that the target TKG is available, the storage node further determines whether the target TKG is degraded. If the target TKG is degraded, block S320 is performed; otherwise, block S330 is performed.

At block S320, the target TKG is repaired, and data writing is performed for the repaired target TKG.

In the examples of the present disclosure, when the storage node determines that the target TKG is available but is degraded, the storage node firstly repairs the target TKG.

It is to be noted that a specific implementation of repairing the target TKG by the storage node at block S320 is made by referring to a repair flow shown in FIG. 2. However, it is to be understood that although the target TKG is degraded at block S320, the target TKG is still available, that is, the number of available Trunks included in the target TKG is greater than or equal to N (M≥0 at this time). But the number of available Trunks included in the unavailable target TKG in the repair flow shown in FIG. 2 is less than N (M=0 at this time). Therefore, in block S320, when the target TKG is repaired, it is to be ensured that the number of available Trunks included in the repaired target TKG is greater than the number of available Trunks included in the unrepaired target TKG.

In block S320, the number of available Trunks included in the unrepaired target TKG is N+M1 (M1≥0), and the number of available Trunks included in the repaired target TKG is N+M2 (M1≤M2≤M).

In some examples, for block S320, the storage node repairs the target TKG in a manner described as blocks S200-S220. When K=(and no repair scheme by which the target TKG is repaired to have N+M available Trunks with any M Trunks belonging to at least K storage nodes exists, the target TKG is not repaired, but data writing is directly performed for the target TKG in the degraded state.

In the examples of the present disclosure, after repairing the target TKG, the storage node performs data writing for the repaired target TKG.

As seen in the examples of the present disclosure, before data writing is performed for the target TKG in the degraded state, the target TKG is firstly repaired, and then, data writing is performed for the repaired target TKG. In a case of sufficient available Trunk resources, before-writing repair replaces after-writing reconstruction, thereby avoiding the resource consumption of the system resulting from the reconstruction and saving the system resources.

At block S330, data writing is performed for the target TKG.

In the examples of the present disclosure, a specific implementation of block S330 is made by referring to relevant descriptions in block S110, which will not be described herein.

At block S340, the target TKG is repaired, and data writing is performed for the repaired target TKG.

In the examples of the present disclosure, a specific implementation of block S340 is made by referring to relevant descriptions in block S120, which will not be described herein.

As can be seen, in the method flow shown in FIG. 3, when part of TKGs are unavailable due to the unavailable disk or node, without directly interrupting services, data writing is directly performed for the available TKGs according to the available state of each TKG in the TKG group, and, data writing is performed for the unavailable TKGs after the unavailable TKGs are repaired, thereby improving service stability. In addition, before data writing is performed for the degraded TKG, the TKG is firstly repaired, and then, data writing is performed for the repaired target TKG. In a case of sufficient available Trunk resources, the before-writing repair replaces the after-writing reconstruction, thereby avoiding the resources consumption of system resulting from the reconstruction and saving the system resources.

Further, in some examples of the present disclosure, when a target disk is recovered from abnormal, it is determined that whether data writing is performed for any TKG associated with the target disk when the target disk is abnormal. If the determination result is yes, the TKG is reconstructed; otherwise, the reconstruction of the TKG is denied.

In the examples, the target disk does not specifically refer to a particular fixed disk, but refers to any disk in the disk resource pool, which will not be described repeatedly in subsequent examples of the present disclosure.

In the traditional RAID2.0 technology, when a disk is recovered from abnormal, data recovery is to be performed for the RAID2.0 array associated with the entire disk in a reconstruction manner, thereby causing resources wastes of system. Therefore, in an example, an incremental reconstruction mechanism is introduced for the TKG associated with the disk recovered from abnormal so as to reduce reconstruction workload.

The recovery from abnormal includes but not limited to recovery of old disk (for example, the disk becomes abnormal due to being erroneously pulled out, and then is re-inserted), recovery of cloned disk (normal data in the abnormal disk is cloned and the abnormal disk is replaced with the cloned disk) or replacement of new disk (the abnormal disk is replaced with a new disk), or the like.

Correspondingly, in the examples, when the target disk is recovered from abnormal, the storage node determines whether data writing is performed for any TKG (Trunks forming the TKG include Trunks belonging to the target disk) associated with the target disk when the target disk is abnormal.

When the target disk is recovered from abnormal, any TKG associated with the target disk will be in the degraded state. Therefore, the above determination of whether data writing is performed for the TKG when the target disk is abnormal is the determination of whether data writing is performed for the TKG when the TKG is in the degraded state.

In the examples, if data writing is performed for the TKG associated with the target disk when the target disk is abnormal, the storage node performs reconstruction (referred to as incremental reconstruction herein) for the TKG when the target disk is recovered. If data writing is not performed for the TKG associated with the target disk when the target disk is abnormal, the storage node denies the reconstruction (referred to as reconstruction exemption herein) of the TKG when the target disk is recovered.

It is to be noted that in the examples of the present disclosure, to realize the incremental reconstruction, the TKG in the degraded state is marked when data writing is performed. Further, when the disk is recovered from abnormal, it is determined that whether data writing is performed for the TKG associated with the disk in the degraded state of the TKG according to whether the TKG carries the above mark. The TKG is reconstructed when carrying the above mark.

In addition, in the examples of the present disclosure, for the TKG in the degraded state, the after-writing reconstruction is avoided with the before-writing repair according to the relevant implementation in the method flow shown in FIG. 3, thereby further reducing the workload of the reconstruction. The specific implementation thereof will not be described herein.

To enable those skilled in the art to better understand the technical solution according to the examples of the present disclosure, the technical solution according to the examples of the present disclosure will be described below in combination with a specific application scenario.

Figure 4:
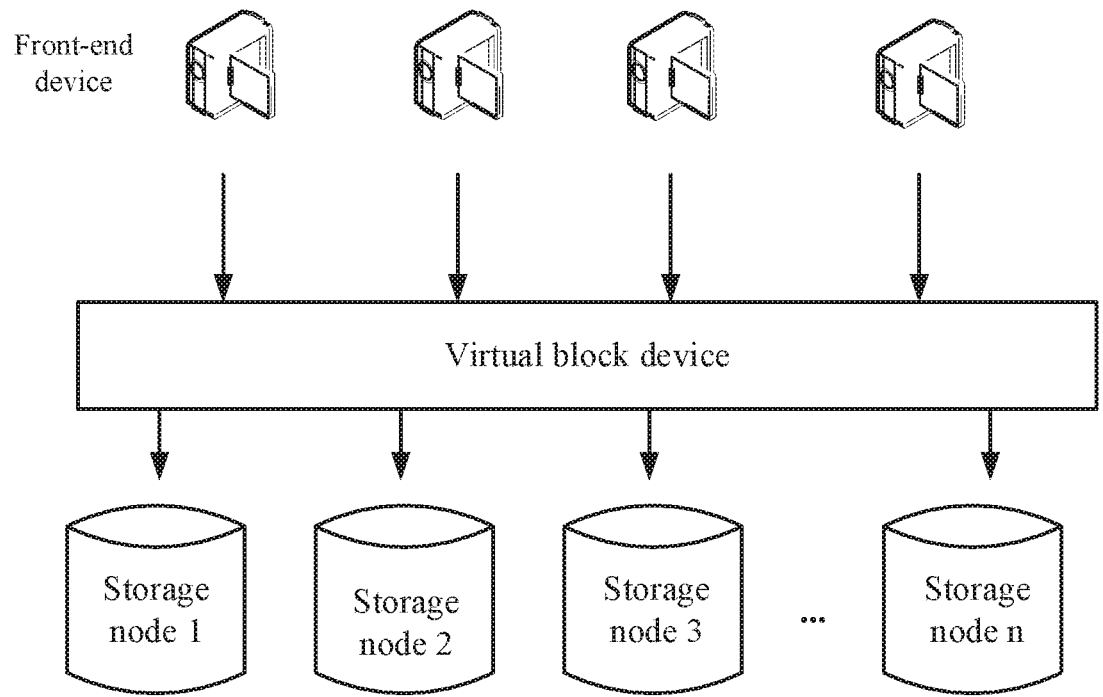
FIG. 4 is a schematic diagram illustrating an application scenario according to some examples of the present disclosure.

FIG. 4 is a schematic diagram illustrating an architecture of an application scenario according to some examples of the present disclosure. As shown in FIG. 4, the application scenario includes a front-end video collection device (hereinafter referred to as a front-end device) and a video storage node (hereinafter referred to as a storage node). The front-end device is, for example, an Internet Protocol Camera (IPC), and the storage node is, for example, a Network Video Recorder (NVR).

In the application scenario, a virtual block device is constructed by organizing disks on a plurality of storage nodes by the distributed RAID according to a particular relationship. Video data from the front-end device is written onto different disks of different storage nodes through the virtual block device.

Each storage node includes a certain quantity of disks, centralized management is performed for the disks of all storage nodes, and each disk is assigned with two attributes; 1) a disk ID used to identify a different disk; and 2) a node ID used to identify a storage node to which the disk belongs.

Based on the above two disk attributes, all disks are divided into a plurality of Trunks having a fixed size, and each Trunk inherits the two attributes of the disk where the Trunk is located. Then, the plurality of Trunks are used to construct a basic storage unit having a N+M mode, that is, TKG. The TKG has N data chunks (Trunks for storing raw data) and M redundant chunks (Trunks for storing check data). When the TKG is constructed, it may be limited that any M Trunks in the TKG are dispersed in at least K different storage nodes. Here, the TKG has a redundancy of M Trunks and a redundancy of K storage nodes at the same time, that is, the TKG allows K storage nodes to be offline.

In some examples, in a case of sufficient disk resources, it is firstly ensured that N+M Trunks in the TKG belong to different disks and then that the TKG has the redundancy of M disks.

For convenience of description, N+M:K refers to a mode of the TKG below.

Based on the application scenario shown in FIG. 4, a data processing solution according to the examples of the present disclosure includes the following contents.

I. An implementation solution that a video recording business is not interrupted by an over-redundant disk (a storage node) is described below.

Based on the designing manner of the above distributed RAID, each TKG has the redundancy of M Trunks, and different Trunks in the TKG belong to different disks when disk resources are sufficient. Therefore, in a case that the number of corrupt disks does not exceed M or the number of offline storage nodes does not exceed K, each TKG is in the normal or degraded state. When the number of corrupt disks exceeds M or the number of offline storage nodes exceeds K, part of TKGs will have over-redundancy (disable). However, since disk formation manners of different TKGs in each TKG group may not be same, the TKGs without using the corrupt disk are still in the available state. At this time, if a video recording channel is written on the available TKG, the service will not be affected. But if the video recording channel is written on the unavailable TKG, the services of the channel may be interrupted.

Correspondingly, in an example, to prevent the corrupt disk from affecting the services, each TKG group is only provided to one channel for use. For example, there are 100 videos to be written at this time, the videos will be correspondingly written onto 100 TKG groups. Since different TKG groups are independent from each other, modification of one TKG group will not affect other TKG groups.

When data writing is performed for any TKG in any TKG group, it is firstly determined that whether the TKG is available; if the TKG is available, data writing is continued; if the TKG is unavailable, the TKG is repaired.

A specific implementation of repairing the TKG is made by referring to the relevant descriptions in a method flow shown in FIG. 2.

Based on repairing TKG during data writing as above, a limitation that the video recording services cannot be performed after the corrupt disks of the RAID exceed the redundancy is broken through.

Further, when the TKG into which video recording data is to be written becomes unavailable due to the corrupt disk, some available Trunks (Trunks corresponding to normal disks) may still exist in the TKG. Data may still be read from these available Trunks. For traditional data storage, the data of this one TKG becomes completely unavailable due to data loss. However, in the present examples, features of the video data and the RAID storage are combined as follows: 1) data storage for the RAID is in the unit of chunk of adjustable size; 2) in the video storage, if the I frames of data exist in the read data, the video data after the I frames may be analyzed out; otherwise, the read data is an invalid data file. Therefore, a playback effect after abnormality is controlled by adjusting the size of the Chunk of the RAID. For example, complete I frames are allowed to be in one Chunk to achieve a good playback effect in a case that a plurality of disks or a plurality of storage nodes are abnormal. In this way, even in the over-redundancy case, a service layer still reads data from the normal Trunk, and the read data is used for playback if such data includes I frames of data. However, when the data on the unavailable TKG is played back, the playback is expressed as video skip playback due to discontinuous data.

II. An implementation solution of reconstruction exemption and incremental reconstruction is described below.

In an example, whether data writing is performed for each TKG in the degraded state is recorded. For the TKG subjected to data writing, data recovery is performed through reconstruction; for the TKG not subjected to data writing, the TKG is exempt from reconstruction.

For the video recording service, after one region is written, this region can be re-written only after one video recording period. However, one video recording period may be as long as one month. That is, a TKG is in a non-written state in most time. In this case, for the entire TKG group, only the TKGs subjected to data writing during a period when the disk is offline (referred to as an incremental region) are to be reconstructed. Thus, the data amount of reconstruction is reduced greatly, thereby decreasing the consumption of system performance.

To further reduce the workload of the reconstruction, the TKG in the degraded state is firstly repaired before data writing is performed, and then, data writing is performed after the repair is completed.

In the examples of the present disclosure, it is determined that whether the target TKG is available when data writing is performed for the target TKG. If the target TKG is available, data writing is performed for the target TKG; otherwise, the target TKG is repaired, and data writing is then performed for the repaired target TKG. Therefore, the service interruption resulted from the TKG unavailability due to the abnormal disk or storage node is avoided, and the service stability is improved.

The method according to the present disclosure is described above. An apparatus according to the present disclosure is described below.

Figure 5:
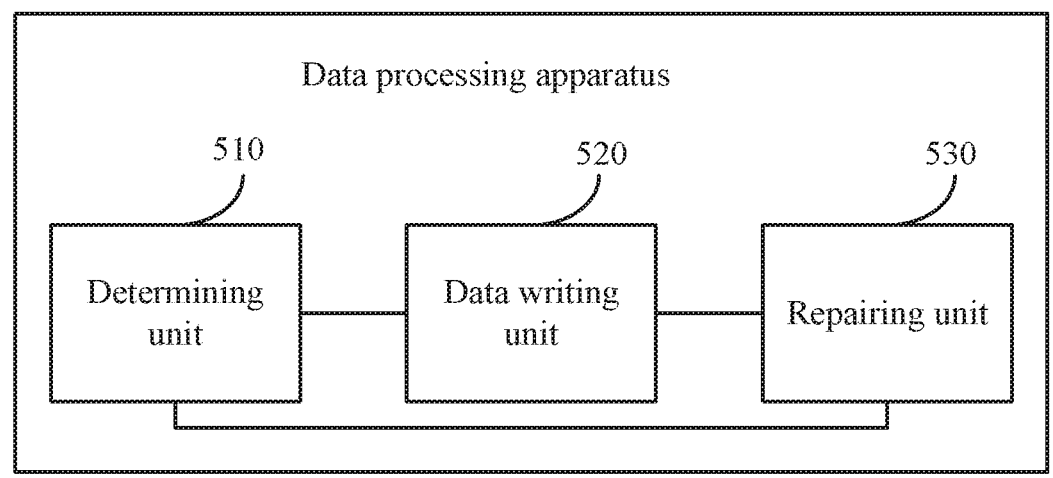
FIG. 5 is a schematic diagram illustrating a structure of a data processing apparatus according to some examples of the present disclosure.

FIG. 5 is a schematic diagram illustrating a structure of a data processing apparatus according to some examples of the present disclosure. The data processing apparatus may be applied to the storage node in the above method example. As shown in FIG. 5, the data processing apparatus includes a determining unit 510, a data writing unit 520 and a repairing unit 530.

The determining unit 510 is configured to determine whether a target Trunk Group (TKG) is available when the data writing unit 520 is to perform data writing for the target TKG. In an initial state, one TKG includes N Trunks for storing raw data and M Trunks for storing check data, and any M Trunks in the N+M Trunks belong to at least K storage nodes, where N≥M, N>1, and 0≤K≤M.

The data writing unit 520 is configured to perform data writing for the target TKG if the target TKG is available.

The repairing unit 530 is configured to repair the target TKG if the data writing unit 520 is to perform data writing for the target TKG and the target TKG is unavailable. In this case, the data writing unit 520 is further configured to perform data writing for the repaired target TKG.

In an implementation, the determining unit 510 is further configured to determine whether a first repair scheme by which the target TKG is repaired to have N+M available Trunks with any M Trunks belonging to at least K storage nodes exists according to available Trunk resources. In this case, if the first repair scheme exists, the repairing unit 530 is configured to repair the target TKG according to the repair scheme.

In an implementation, if the first repair scheme does not exist and K>0, the determining unit 510 is further configured to let K=K−1 and repeatedly determine whether the first repair scheme exists until it is determined that the first repair scheme exists or K=0. If the first repair scheme exists, the repairing unit 530 is further configured to repair the target TKG according to the repair scheme. If K=0, the determining unit 510 is further configured to determine whether a second repair scheme by which the target TKG is repaired to have N+M available Trunks exists according to the available Trunk resources. If the second repair scheme exists, the repairing unit 530 is further configured to repair the target TKG according to the second repair scheme. If the second repair scheme does not exist and M>0, the determining unit 510 is further configured to let M=M−1 and repeatedly determine whether the second repair scheme exists until it is determined that the second repair scheme exists or M=0. If the second repair scheme exists, the repairing unit 530 is configured to repair the target TKG according to the repair scheme; if M=0 and the repair scheme by which the target TKG is repaired to have N+M available Trunks does not exist, the repairing unit 530 is configured to determine that the target TKG is unsuccessfully repaired.

Figure 6:
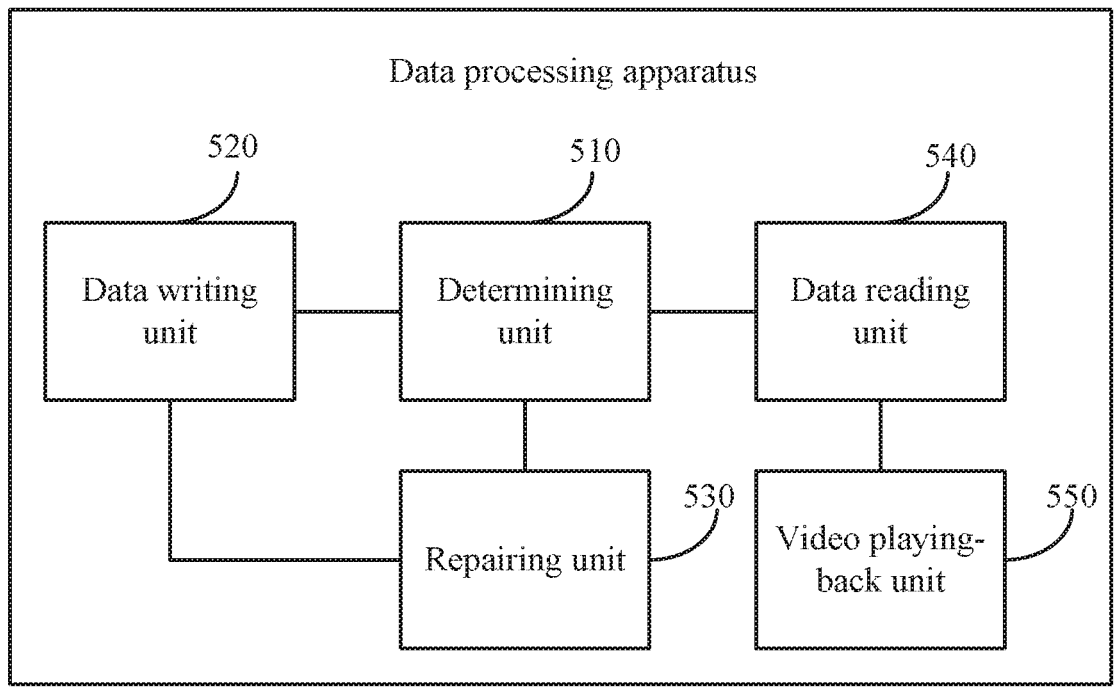
FIG. 6 is a schematic diagram illustrating a structure of another data processing apparatus according to some examples of the present disclosure.

In an implementation, the data is video data. Correspondingly, as shown in FIG. 6, the apparatus further includes: a data reading unit 540 and a video playing-back unit 550.

The data reading unit 540 is configured to read video data from the available Trunks included in the target TKG when video playback is to be performed according to the data in the target TKG and the target TKG is unavailable.

The video playing-back unit 550 is configured to perform video playback according to the read video data if the read video data includes I frames of data.

Figure 7:
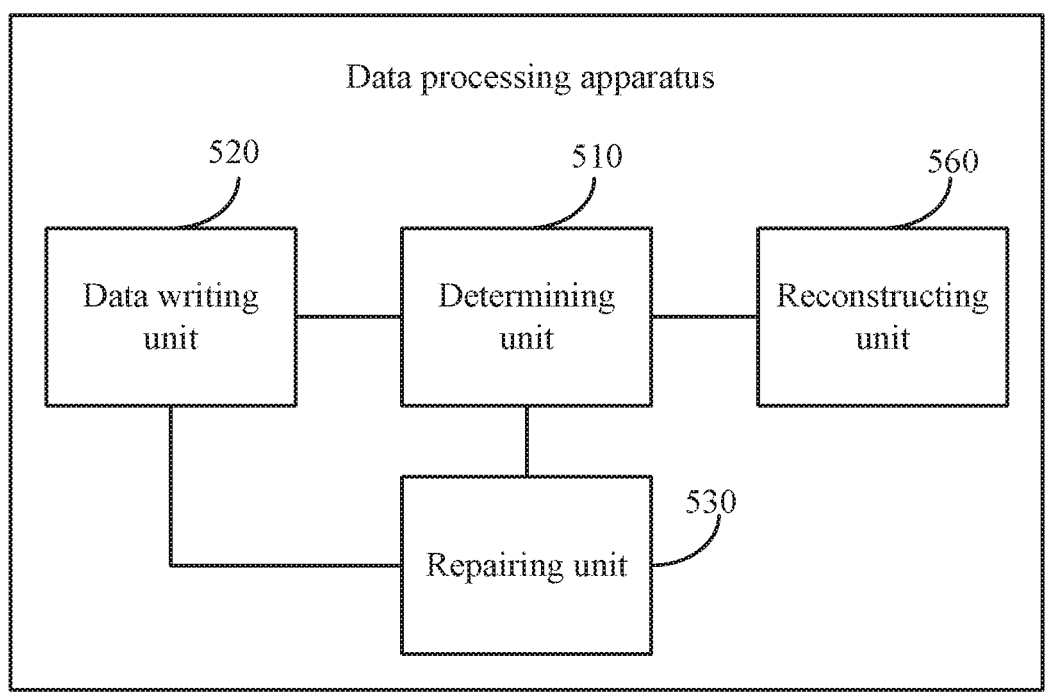
FIG. 7 is a schematic diagram illustrating a structure of still another data processing apparatus according to some examples of the present disclosure.

In an implementation, when a target disk is recovered from abnormal, the determining unit 510 is further configured to determine whether data writing is performed for any TKG associated with the target disk when the target disk is abnormal. Correspondingly, as shown in FIG. 7, the apparatus further includes: a reconstructing unit 560 configured to reconstruct the TKG if data writing is performed for the TKG when the target disk is abnormal; otherwise, the reconstructing unit 560 denies reconstructing the TKG.

In an implementation, if the target TKG is available, the determining unit 510 is further configured to determine whether the target TKG is degraded; if the target TKG is degraded, the repairing unit 530 is further configured to repair the target TKG; the data writing unit 520 is further configured to perform data writing for the repaired target TKG; if the target TKG is not degraded, the data writing unit 520 performs data writing for the target TKG.

Figure 8:
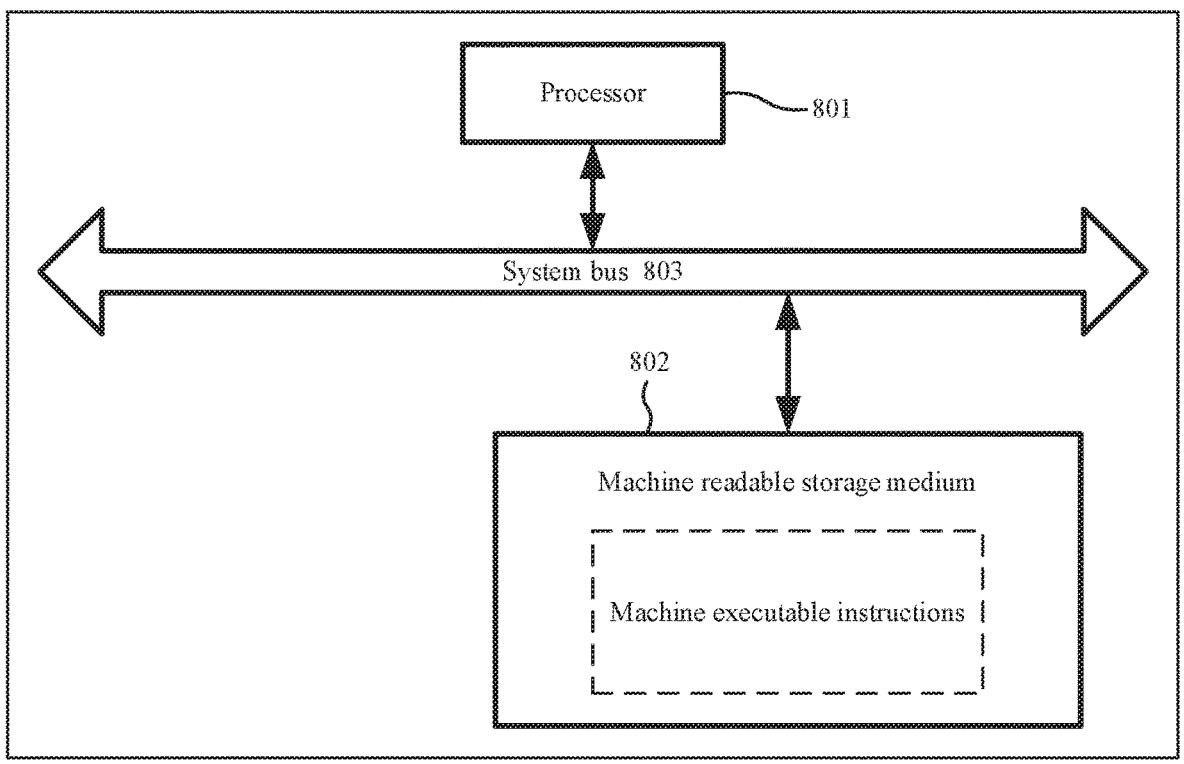
FIG. 8 is a schematic diagram illustrating a hardware structure of a data processing apparatus according to some examples of the present disclosure.

FIG. 8 is a schematic diagram illustrating a hardware structure of a data processing apparatus according to some examples of the present disclosure. The data processing apparatus includes a processor 801 and a machine readable storage medium 802 storing machine executable instructions. The processor 801 and the machine readable storage medium 802 communicate with each other via a system bus 803. Further, by reading and executing the machine executable instructions stored in the machine readable storage medium 802 and corresponding to a data processing logic, the processor 801 is caused to perform the data processing method described above.

The machine readable storage medium 802 mentioned herein may be any of electronic, magnetic, optical or other physical storage apparatuses and may contain or store information such as executable instructions, data and so on. For example, the machine readable storage medium may be a Random Access Memory (RAM), a volatile memory, a non-volatile memory, a flash memory, a storage drive (e.g. hard disk drive), a solid state harddisk, any type of storage disk (e.g., compact disk, Digital Video Disk (DVD)), or a similar storage medium, or a combination thereof.

Some examples of the present disclosure further provide a machine readable storage medium including machine executable instructions, for example, the machine readable storage medium 802 in FIG. 8, and the machine executable instructions are executed by the processor 801 in the data processing apparatus to implement the data processing method described above.

It is to be noted that the relational terms such as "first" and "second" used herein are merely intended to distinguish one entity or operation from another entity or operation rather than to require or imply any such actual relation or order existing between these entities or operations. Further, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of examples of the present disclosure but not intended to limit the present disclosure, and any modifications, equivalent substitutions, adaptations thereof made within the spirit and principles of the disclosure shall fall within the scope of the present disclosure.

The invention claimed is:

1. A data processing method, comprising: in response to determining that data writing is to be performed for a target Trunk Group (TKG), determining whether the target TKG is available, wherein, in an initial state, one TKG comprises N+M Trunks having N Trunks for storing raw data and M Trunks for storing check data, and any M Trunks in the N+M Trunks belong to at least K storage nodes, where N>M, N>1, and O<K<M; and performing the data writing based on a result of determining whether the target TKG is available, the performing comprising one of: if the target TKG is available, performing data writing for the target TKG, or if the target TKG is unavailable, repairing the target TKG and performing data writing for the repaired target TKG, wherein repairing the target TKG comprises: determining whether a first repair scheme by which the target TKG is repaired to have N+M available Trunks with any M Trunks belonging to the at least K storage nodes exists according to available Trunk resources; and repairing the target TKG based on a result of determining whether the first repair scheme exists, comprising at least one of: if the first repair scheme exists, repairing the target TKG according to the first repair scheme; if the first repair scheme does not exist and K>O, letting K=K−1 and repeating determining whether the first repair scheme by which the target TKG is repaired to have N+M available Trunks with any M Trunks belonging to the at least K storage nodes exists according to the available Trunk resources until it is determined that the first repair scheme exists or K=O; if K=O, determining whether a second repair scheme by which the target TKG is repaired to have N+M available Trunks exists according to the available Trunk resources; if the second repair scheme exists, repairing the target TKG according to the second repair scheme; if the second repair scheme does not exist and M>O, letting M=M−1, and repeatedly determining whether the second repair scheme exists until it is determined that the second repair scheme exists or M=O; if the second repair scheme exists, repairing the target TKG according to the second repair scheme; or if M=O, determining that the target TKG is unsuccessfully repaired.

2. The method according to claim 1, wherein the data is video data, and wherein the method further comprises: in response to determining that video playback is to be performed according to the data in the target TKG and the target TKG is unavailable, reading video data from the available Trunks included in the target TKG; and in response to determining that the read video data comprises I frames of data, performing video playback according to the read video data.

3. The method according to claim 1, further comprising: in response to determining that a target disk is recovered from abnormal, determining whether data writing is performed for any TKG associated with the target disk when the target disk is abnormal; and if determining that the data writing is performed, reconstructing the TKG or if determining that the data writing is not performed, denying reconstructing the TKG.

4. The method according to claim 1, further comprising: if the target TKG is available, before performing the data writing for the target TKG, determining whether the target TKG is degraded; and if determining that the target TKG is degraded, repairing the target TKG and performing data writing for the repaired target TKG, or if determining that the target TKG is not degraded, determining to perform the data writing for the target TKG.

5. A data processing apparatus, comprising: at least one processor; and at least one memory coupled to the at least one processor and storing machine executable instructions executable by the at least one processor to perform operations comprising: determining whether a target Trunk Group (TKG) is available in response to determining that data writing is to be performed for the target TKG, wherein, in an initial state, one TKG comprises N+M Trunks having N Trunks for storing raw data and M Trunks for storing check data, and any M Trunks in the N+M Trunks belong to at least K storage nodes, where $N>M$, $N>1$, and $0<K<M$; and performing the data writing based on a result of determining whether the target TKG is available, the performing comprising one of: performing data writing for the target TKG if the target TKG is available; or repairing the target TKG and performing data writing for the repaired target TKG if the target TKG is unavailable, wherein repairing the target TKG comprises: determining whether a first repair scheme by which the target TKG is repaired to have N+M available Trunks with any M Trunks belonging to the at least K storage nodes exists according to available Trunk resources; and repairing the target TKG based on a result of determining whether the first repair scheme exists, comprising at least one of: if the first repair scheme exists, repairing the target TKG according to the first repair scheme; if the first repair scheme does not exist and $K>0$, letting $K=K-1$ and repeating determining whether the first repair scheme by which the target TKG is repaired to have N+M available Trunks with any M Trunks belonging to the at least K storage nodes exists according to the available Trunk resources until it is determined that the first repair scheme exists or $K=0$; if $K=0$, determining whether a second repair scheme by which the target TKG is repaired to have N+M available Trunks exists according to the available Trunk resources: if the second repair scheme exists, repairing the target TKG according to the second repair scheme; if the second repair scheme does not exist and $M>0$, letting $M=M-1$, and repeatedly determining whether the second repair scheme exists until it is determined that the second repair scheme exists or $M=0$; if the second repair scheme exists, repairing the target TKG according to the second repair scheme; or if $M=0$, determining that the target TKG is unsuccessfully repaired.

6. The apparatus according to claim 5, wherein the data is video data, and wherein the operations further comprise: in response to determining that video playback is to be performed according to the data in the target TKG and the target TKG is unavailable, reading video data from the available Trunks included in the target TKG; and in response to determining that the read video data comprises I frames of data, performing video playback according to the read video data.

7. The apparatus according to claim 5, wherein the operations further comprise: in response to determining that a target disk is recovered from abnormal, determining whether data writing is performed for any TKG associated with the target disk when the target disk is abnormal; and if determining that the data writing is performed, reconstructing the TKG, or if determining that the data writing is not performed, denying reconstructing the TKG.

8. The apparatus according to claim 5, wherein the operations further comprise: if the target TKG is available, before performing the data writing for the target TKG, determining whether the target TKG is degraded; and if determining that the target TKG is degraded, repairing the target TKG and performing data writing for the repaired target TKG, or if determining that the target TKG is not degraded, determining to perform the data writing for the target TKG.

* * * * *